(12) United States Patent
Birgler et al.

(10) Patent No.: US 9,239,001 B2
(45) Date of Patent: Jan. 19, 2016

(54) HEAT EXCHANGER

(71) Applicant: Eberspächer Exhaust Technology GmbH & Co. KG, Neunkirchen (DE)

(72) Inventors: Markus Birgler, Wernau (DE); Gerd Gaiser, Reutlingen (DE); Matthias Feuerbach, Esslingen (DE); Christof Klingler, Lenningen (DE); Jürgen Schweizer, Stuttgart (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 127 days.

(21) Appl. No.: 14/026,373

(22) Filed: Sep. 13, 2013

(65) Prior Publication Data
US 2014/0165558 A1  Jun. 19, 2014

(30) Foreign Application Priority Data
Sep. 14, 2012  (DE) .................. 10 2012 216 452

(51) Int. Cl.
*F02B 47/08*  (2006.01)
*F28F 1/00*  (2006.01)
(Continued)

(52) U.S. Cl.
CPC .......... *F02B 47/08* (2013.01); *F01N 3/043* (2013.01); *F01N 5/02* (2013.01); *F02M 25/0731* (2013.01); *F02M 25/0737* (2013.01); *F28D 7/0066* (2013.01); *F28D 7/024* (2013.01); *F28D 21/0003* (2013.01); *F28F 1/00* (2013.01); *F28F 1/24* (2013.01); *F28F 1/36* (2013.01); *F01N 2240/02* (2013.01); *F01N 2240/36* (2013.01); *F01N 2410/00* (2013.01);
(Continued)

(58) Field of Classification Search
USPC .......................................... 60/602, 608, 320
See application file for complete search history.

(56) References Cited

U.S. PATENT DOCUMENTS 2,364,130 A  12/1944  Clancy
2,508,247 A   5/1950  Giauque
(Continued)

FOREIGN PATENT DOCUMENTS

DE  10 2005 039 794 A1  3/2007
DE  10 2008 014 169 A1  1/2009
(Continued)

OTHER PUBLICATIONS

Abstract Machine Translation JPS 59-196983 Done Feb. 24, 2015.*

*Primary Examiner* — Audrey K Bradley
*Assistant Examiner* — Dapinder Singh
(74) *Attorney, Agent, or Firm* — McGlew and Tuttle, P.C.

(57) ABSTRACT

A heat exchanger (28) has a first inlet (29) and a first outlet (30), which are fluidically connected with one another via a first path (31) carrying for a first medium to be cooled. A second inlet (32) and a second outlet (33) are fluidically connected with one another via a second path (34) carrying a second medium. A third inlet (35) and a third outlet (36) are fluidically connected with one another via a third path (37) carrying a third medium. The first path (31) is coupled with the second path (34) and with the third path (37) in a heat-transferring manner and in such as way that the media are separated. The heat-transferring coupling between the first path and the second path takes place upstream of the heat-transferring coupling between the first path and the third path relative to the direction of flow of the first medium.

20 Claims, 6 Drawing Sheets

(51) Int. Cl.
  *F01N 3/04*     (2006.01)
  *F01N 5/02*     (2006.01)
  *F02M 25/07*    (2006.01)
  *F28D 7/02*     (2006.01)
  *F28F 1/36*     (2006.01)
  *F28D 7/00*     (2006.01)
  *F28D 21/00*    (2006.01)
  *F28F 1/24*     (2006.01)

(52) U.S. Cl.
  CPC ........... *F28F 2250/06* (2013.01); *Y02T 10/121* (2013.01); *Y02T 10/16* (2013.01); *Y02T 10/20* (2013.01)

(56) References Cited

U.S. PATENT DOCUMENTS

| | | |
|---|---|---|
| 3,062,510 A | 11/1962 | Percival |
| 4,498,524 A | 2/1985 | Jacobsen |
| 8,006,651 B2 | 8/2011 | Veitch et al. |
| 8,517,084 B2 | 8/2013 | Kaspersen et al. |
| 8,522,537 B2 | 9/2013 | Lee et al. |
| 2004/0159110 A1 | 8/2004 | Janssen |
| 2005/0133202 A1 | 6/2005 | Jorgensen et al. |
| 2005/0262842 A1 | 12/2005 | Claassen et al. |
| 2008/0264609 A1 | 10/2008 | Lutz et al. |
| 2009/0044789 A1* | 2/2009 | Eitel et al. ............... 123/568.12 |
| 2011/0131961 A1 | 6/2011 | Lee et al. |
| 2012/0144814 A1 | 6/2012 | Won et al. |
| 2013/0068202 A1* | 3/2013 | Kardos et al. ............... 123/563 |

FOREIGN PATENT DOCUMENTS

| | | |
|---|---|---|
| DE | 10 2010 039 281 A1 | 6/2011 |
| GB | 2 143 589 A | 2/1985 |
| JP | S 59-196983 | * 11/1984 |
| WO | 84/00193 A1 | 1/1984 |

* cited by examiner

HEAT EXCHANGER

CROSS REFERENCE TO RELATED APPLICATIONS

This application claims the benefit of priority under 35 U.S.C. §119 of German Patent Application DE 10 2012 216 452.9 filed Sep. 14, 2012, the entire contents of which are incorporated herein by reference.

FIELD OF THE INVENTION

The present invention pertains to a heat exchanger as well as to a device equipped therewith. The present invention pertains, besides, to a vehicle equipped with such a device.

BACKGROUND OF THE INVENTION

Heat exchangers, in which a first medium is coupled with a second medium in a heat-transferring manner and such that the media are separated, are generally known. Heat exchangers of a compact and low-cost design are used, for example, in vehicles. Modern motor vehicles may be equipped with a waste heat utilization unit, for example, in order to utilize heat being entrained in the exhaust gas of an internal combustion engine. Such a waste heat utilization unit may operate, for example, according to a Rankine cycle, especially according to a Rankine-Clausius cycle. Such a cycle comprises an evaporator, in which a working medium can be evaporated. Such an evaporator may be advantageously integrated into an exhaust system of the internal combustion engine, so that the heat of the exhaust gas can be used to evaporate the working medium. Furthermore, an engine cooling circuit may be provided for cooling an engine block of the internal combustion engine, and a vehicle cooler, in which a cooling air stream is coupled in the usual manner with a cooling agent in a heat-transferring manner, which removes the excess heat from the engine block, may be integrated into said engine cooling circuit.

SUMMARY OF THE INVENTION

An object of the present invention is to propose an improved embodiment, which is characterized especially by a compact design and high efficiency, for a heat exchanger of the type mentioned in the introduction or for a device equipped therewith or for a vehicle equipped therewith.

According to the invention, a heat exchanger is provided with a first inlet and a first outlet for the first medium to be cooled, which are fluidically connected with one another via a first path carrying the first medium, with a second inlet and a second outlet for a second medium to be heated, which are fluidically connected with one another via a second path carrying the second medium and with a third inlet and a third outlet for a third medium to be heated, which are fluidically connected with one another via a third path carrying the third medium. The first path is coupled with the second path and with the third path in a heat-transferring manner and such that the media are separated from one another. The heat-transferring coupling between the first path and the second path takes place upstream of the heat-transferring coupling between the first path and the third path in relation to the direction of flow of the first medium.

According to another aspect of the invention, a device is provided with an internal combustion engine, which has a fresh air feed unit for feeding fresh air to combustion chambers of the internal combustion engine and an exhaust system for removing exhaust gas from the combustion chambers. The device includes a waste heat utilization unit, which has, in a waste heat utilization circuit, in which a working medium circulates, an evaporator for evaporating the working medium, downstream therefrom an expansion engine for expanding the working medium, downstream therefrom a condenser for condensing the working medium and downstream therefrom a feed unit for driving the working medium in the waste heat utilization circuit. The device includes a cooling circuit, in which a cooling medium circulates and at least one heat exchanger as described above. The first path is integrated into the exhaust system, so that the exhaust gas forms the first medium. The second path is integrated into the waste heat utilization circuit, so that the working medium forms the second medium and that the heat-transferring coupling between the first path and the second path forms the evaporator. The third path is integrated into the cooling circuit, so that the cooling medium forms the third medium.

According to another aspect of the invention, a device is provided with an internal combustion engine, which has a fresh air feed unit for feeding fresh air to combustion chambers of the internal combustion engine, an exhaust system for removing exhaust gas from the combustion chambers as well as an exhaust gas-recirculating unit for recirculating exhaust gas from the exhaust system to the fresh air feed unit. The device includes a waste heat utilization unit, which has, in a waste heat utilization circuit, in which a working medium circulates, an evaporator for evaporating the working medium, downstream therefrom an expansion engine for expanding the working medium, downstream therefrom a condenser for condensing the working medium and downstream therefrom a feed means for driving the working medium in the waste heat utilization circuit. The device also includes a cooling circuit, in which a cooling medium circulates and which has a cooler for cooling the recirculated exhaust gas and at least one heat exchanger as described above. The first path is integrated into the exhaust gas-recirculating unit, so that the recirculated exhaust gas forms the first medium. The second path is integrated into the waste heat utilization circuit, so that the working medium forms the second medium, and that the heat-transferring coupling between the first path and the second path forms the evaporator. The third path is integrated into the cooling circuit, so that the cooling medium forms the third medium and that the heat-transferring coupling between the first path and the third path forms the cooler.

The present invention is based on the general idea of designing the heat exchanger such that a primary-side first medium is coupled in it on the secondary side with at least two more media, i.e., at least with both a second medium and a third medium in a heat-transferring manner, but separately, namely one after another, so that the second medium is coupled first with the first medium in a heat-transferring manner in the direction of flow of the first medium, and the third medium is coupled with the first medium in a heat-transferring manner only thereafter. If more than two media are provided on the secondary side, each additional medium, i.e., for example, a fourth medium, may be coupled with the first medium in a heat-transferring manner downstream of the third medium. The first medium supplies the heat, which is transferred in two steps or in more than two steps at first to the second medium and then to the third medium and then optionally to at one additional medium. In case of corresponding volume flows of the media, it is possible due to the mode of construction being proposed, in particular, to heat the second medium by means of the heat of the first medium to a higher temperature than the third medium. As a result, the dual heat exchanger, which may also be called a double heat exchanger, can be used in many different ways, and at the same time it has a compact design and, in particular, requires less space for its installation than two separate heat exchangers. Furthermore, the integration of this double heat exchanger into a first path carrying the first medium can be embodied in an especially simple manner such that both a second path carrying the second medium and a third path carrying the third medium are then coupled with the first path in a heat-transferring manner. As a consequence, the heat exchanger being described here can be installed into a complex system in a simpler manner, which is located, for example, in the periphery of an internal combustion engine and preferably in a vehicle.

The second path and the third path are passed through the heat exchanger such that their media are separated from each other and from the first path and optionally from the fourth path. As a consequence, it is also possible to use different media for the second path and the third path. In particular, the second path and the third path can be operated at different temperature levels. Analogous features can in this case also be provided for each additional secondary-side path.

To embody such a heat exchanger, the present invention specifically proposes that this heat exchanger be equipped with a first inlet and a first outlet for a first medium to be cooled, which are fluidically connected with one another via a first path carrying the first medium. Furthermore, a second inlet and a second outlet are provided for a second medium to be heated, which are fluidically connected with one another via a second path carrying the second medium. Finally, a third inlet and a third outlet for a third medium to be heated are provided, which are fluidically connected with one another via a third path carrying the third medium. Furthermore, the first path is coupled with the second path and with the third path in a heat-transferring manner such that the media are separated, wherein the heat-transferring coupling between the first path and the second path takes place upstream of the heat-transferring coupling between the first path and the third path in relation to the direction of flow of the first medium. Just as the second path and the third path, the first path is sealed against and separated from an environment of the heat exchanger. As a result, the heat exchanger is defined especially by an assembly unit or structural unit that has all ports for the integration of the heat exchanger into external lines carrying the media, which contains internally the media paths and which also makes possible and contains, besides, the heat-transferring coupling of the first path with the second path and with the third path. Corresponding inlets and outlets may also be present for each additional secondary-side path in a corresponding manner.

According to an advantageous embodiment, a fourth path or bypass path may be provided on the primary side for carrying the first medium, and this fourth path connects fluidically the first inlet with the first outlet, bypassing the heat-transferring couplings of the first path with the second path and with the third path. Moreover, a control means (control) may be provided for controlling the flow of the first medium through the first path and the fourth path. The control means may be designed, for example, such that it can open and close the fourth path, and at least one intermediate position may also be optionally able to be set. As an alternative, the control means may be designed such that it can close and open the first path, and at least one intermediate position may optionally be able to be set here as well. With the fourth path closed, the first medium flows through the first path. With the fourth path closed, the first medium flows predominantly through the fourth path because of the increased flow resistance in the first path, which is generated by the heat-transferring couplings with the second path and with the third path. In principle, any desired splitting of a flow of the first medium between the first path and the fourth path can be set by means of the control means. For example, the control means can be actuated depending on the heat content of the first medium and/or the heat demand of the second medium and of the third medium. The goal of regulation may be, for example, to avoid superheating of the second medium and/or of the third medium or to set a target temperature for the first medium or for the second medium or for the third medium. The higher the percentage of the first medium that flows through the first path, the more heat can be transferred to the second medium and to the third medium. The higher the percentage of the first medium that flows through the fourth path, the lower is the heat transfer to the second medium and to the third medium.

Especially advantageous is an embodiment in which a common housing is provided, which has such inlets and said outlets and which contains such paths. The common housing thus has separate ports for the first inlet, for the second inlet, for the third inlet, for the first outlet, for the second outlet and for the third outlet, and contains structures, especially walls, tubes and lines, which define the first path, the second path and the third path. If the above-mentioned fourth path is provided as well, the fourth path is also formed in the common housing. Thanks to the use of a common housing, the heat exchanger being presented here can be integrated in an especially simple manner and in a compact form in a complex device, which comprises a line system, into the lines of which the individual paths can be integrated.

According to an especially advantageous embodiment, a housing of the heat exchanger may contain a preferably straight and/or cylindrical tube and have a preferably straight and/or cylindrical jacket, which envelops the tube while forming a ring channel. The first path is then led through the ring channel. The second path is led through a first coil, which extends in the ring channel and winds around the tube in a helical pattern. The third path is led through a second coil, which extends in the ring channel and winds around the tube in a helical pattern. If the fourth path is provided, the fourth path is led through the tube. The corresponding control means can have in this case, for example, a control element arranged in the tube for changing the cross section of the tube, through which cross section flow is possible. This leads to an especially compact mode of construction of the heat exchanger, and the respective coil provides a large heat-transferring surface and correspondingly makes possible an efficient heat transfer between the first medium and the second medium or the third medium. The second coil is arranged in the ring channel downstream of the first coil in relation to the direction of flow. The two coils in the ring channel may border on each other axially. The tubular design being presented here, in which the tube and the jacket have round, e.g., circular or elliptical or oval cross sections and extend cylindrically, make possible relatively high pressures on the primary side, whereby the use of the heat exchanger on the primary side in the exhaust gas stream is facilitated. Such coils can likewise be subjected to relatively high pressures on the inside as well as on the outside, which facilitates the use of the heat exchanger on the primary side in an exhaust gas stream and on the secondary side in, e.g., a waste heat utilization circuit.

If more than two media or paths are provided on the secondary side, more than two coils, which follow each other axially, may be present as well.

The tube may be connected directly to the first inlet and to the first outlet and have an inlet area that is permeable for the first medium, especially perforated, for the first medium and an outlet area that is permeable, especially perforated, for the first medium.

According to an advantageous variant, at least one of the coils may have a spiral tube, which carries the respective medium inside and which carries cooling fins exposed to the first medium on the outside. Both coils are advantageously equipped with such a spiral tube and cooling fins. The cooling fins may be designed as ring disks, which are arranged at axially spaced locations from one another at the spiral tube on the outside. As an alternative, the cooling fins may also be embodied with a strip, which is wound helically around the spiral tube. The cooling fins may be pressed here onto the spiral tube or soldered thereto or welded thereto.

Depending on the conditions of use, preferably iron alloys, preferably steel, especially stainless steel, are used as materials for the housing, especially for the tube and the jacket as well as for the coils, especially for the corresponding spiral tube and for the cooling fins. Furthermore, light metals or light metal alloys, e.g. aluminum or aluminum alloys, may be used as well. Copper or a copper alloy may also be used as an alternative. The surfaces exposed to the exhaust gas may also be provided with a protective coating, especially a ceramic protective coating for protection against corrosive exhaust gas. Coils made of copper may be preferably provided with such a protective coating on the outside.

A first device according to the present invention comprises an internal combustion engine, which has a fresh air feed unit for supplying combustion chambers of the internal combustion engine with fresh air and an exhaust system for removing exhaust gas from the combustion chambers. Furthermore, the device is equipped with a waste heat utilization unit, which has a waste heat utilization circuit, in which a working medium circulates, an evaporator for evaporating the working medium, downstream therefrom an expansion engine for expanding the working medium, downstream therefrom a condenser for condensing the working medium, and downstream therefrom a feed means for driving the working medium in the waste heat utilization circuit. Furthermore, the device is equipped with a cooling circuit, in which a cooling medium circulates. In addition, the device is equipped with a heat exchanger of the above-described type, in which the first path is integrated into the exhaust system, so that the exhaust gas forms the first medium. Furthermore, the second path is integrated into the waste heat utilization path, so that the working medium forms the second medium and the heat-transferring coupling between the first path and the second path forms the evaporator. Finally, the third path is integrated into the cooling circuit, so that the cooling medium forms the third medium. Within such a device, the heat exchanger being presented here thus defines, on the one hand, an evaporator and, on the other hand, a cooler. A comparatively large quantity of heat can be removed from the exhaust gas via the evaporator, and this happens at a comparatively high temperature level. The exhaust gas can be cooled further via the cooler, for example, to a desired target temperature. The cooling circuit can be operated in this case at a markedly lower temperature level than the waste heat utilization circuit. The device being presented here can have a comparatively compact design by means of the heat exchanger being presented here.

A second device according to the present invention differs from the above-described first device in that an exhaust gas-recirculating unit for recirculating exhaust gas from the exhaust system to the fresh air feed unit is additionally provided, wherein the cooling circuit has a cooler for cooling the recirculated exhaust gas. The heat exchanger can thus be integrated into the device in this case such that the first path is integrated into the exhaust gas-recirculating unit, so that recirculated exhaust gas in this case forms the first medium. The second path is integrated into the waste heat utilization circuit here as well, so that the working medium forms the second medium and the heat-transferring coupling between the first path and the second path forms the evaporator. The third path is integrated into the cooling circuit in this second device as well, so that the cooling medium also forms the third medium. In addition, the heat-transferring coupling between the first path and the third path forms the cooler for cooling the recirculated exhaust gas in this second device. A waste heat utilization unit can be integrated into an exhaust gas-recirculating unit in an especially compact manner due to the device being presented here, so that efficient cooling of the recirculated exhaust gas can be achieved, on the one hand, while, on the other hand, the heat generated in the process can be utilized. Such a mode of construction is especially advantageous if comparatively high exhaust gas recirculation rates are reached in internal combustion engines having a comparatively large volume. An engine cooling circuit, which is used to cool a conventional exhaust gas recirculation cooler, can be considerably relieved by means of such a heat exchanger in case of a heat-transferring coupling of the exhaust gas recirculation with the waste heat utilization circuit. The total quantity of energy that can be removed from the exhaust gas via the part of the heat exchanger that acts as an evaporator does not need to be absorbed by the engine cooling circuit any longer.

Furthermore, it is possible to equip the device with at least two such heat exchangers, in which case one of them may be arranged on the primary side in the exhaust system and the other can be arranged on the primary side in the exhaust gas-recirculating unit. The two heat exchangers may be connected independently from one another on the secondary side. It is also conceivable to connect the two heat exchangers in series on the secondary side, for example, in order to evaporate the working medium of the waste heat utilization circuit in the heat exchanger, through which it flows first, and to superheat it in the heat exchanger through which it flows next.

According to an advantageous embodiment, the cooling circuit may be used to cool the internal combustion engine. In addition or as an alternative, the cooling circuit may be used to heat an air stream to air condition a space, especially a passenger compartment of a vehicle.

A vehicle according to the present invention, which may be, for example, a land craft or an aircraft or a watercraft, comprises a drivetrain for driving the vehicle as well as a device of the above-described type, wherein the internal combustion engine is connected to the drivetrain for the purpose of driving. In other words, the internal combustion engine is used in the vehicle to drive the vehicle.

It is apparent that the above-described features, which will also be explained below, may be used not only on the particular combination indicated, but in other combinations or alone as well, without going beyond the scope of the present invention.

Preferred embodiments of the present invention are shown in the drawings and will be explained in more detail in the following description, in which identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
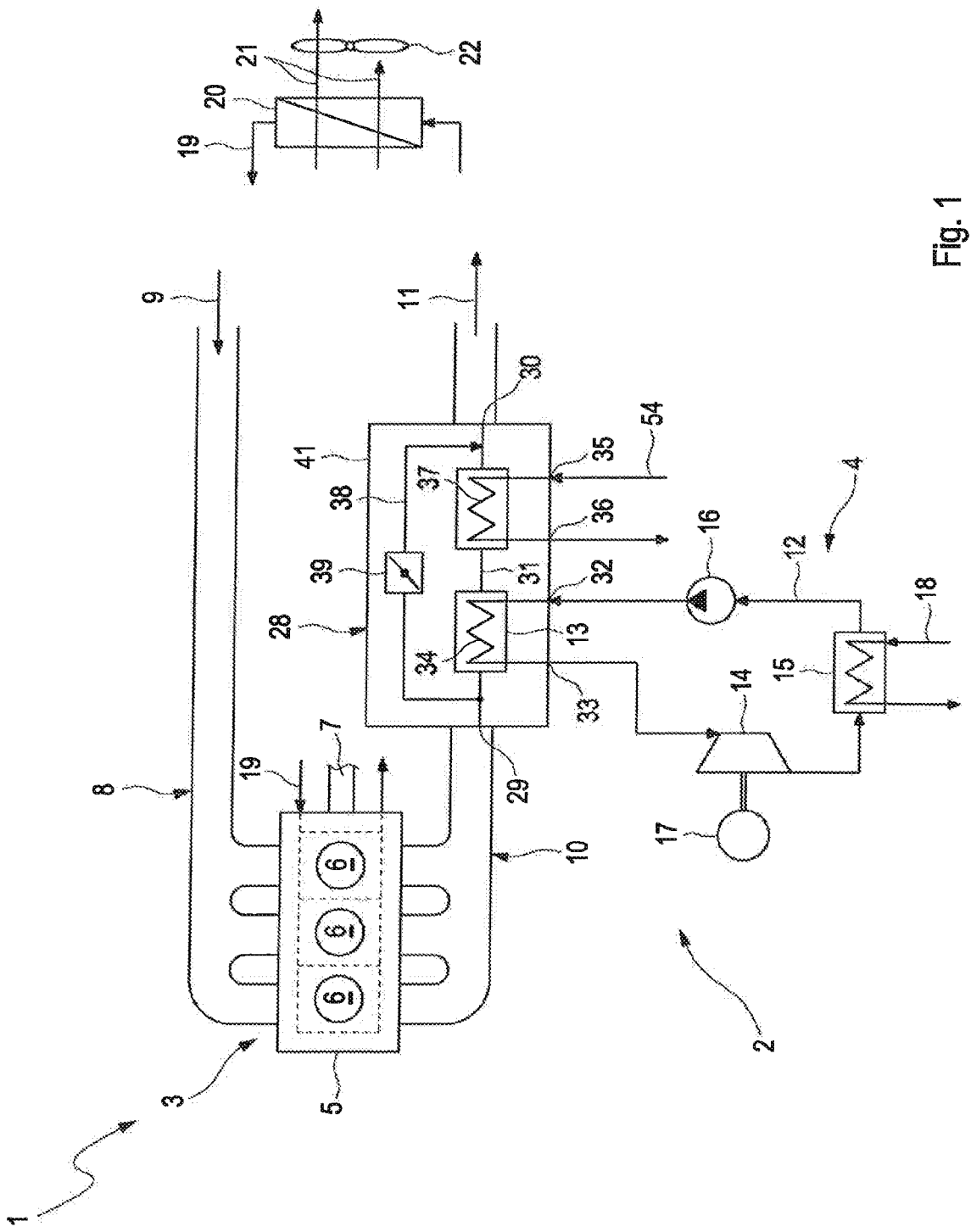
FIG. 1 is a highly simplified block diagram-like schematic view of a vehicle with a device according to the invention in one of various embodiments.
Figure 2:
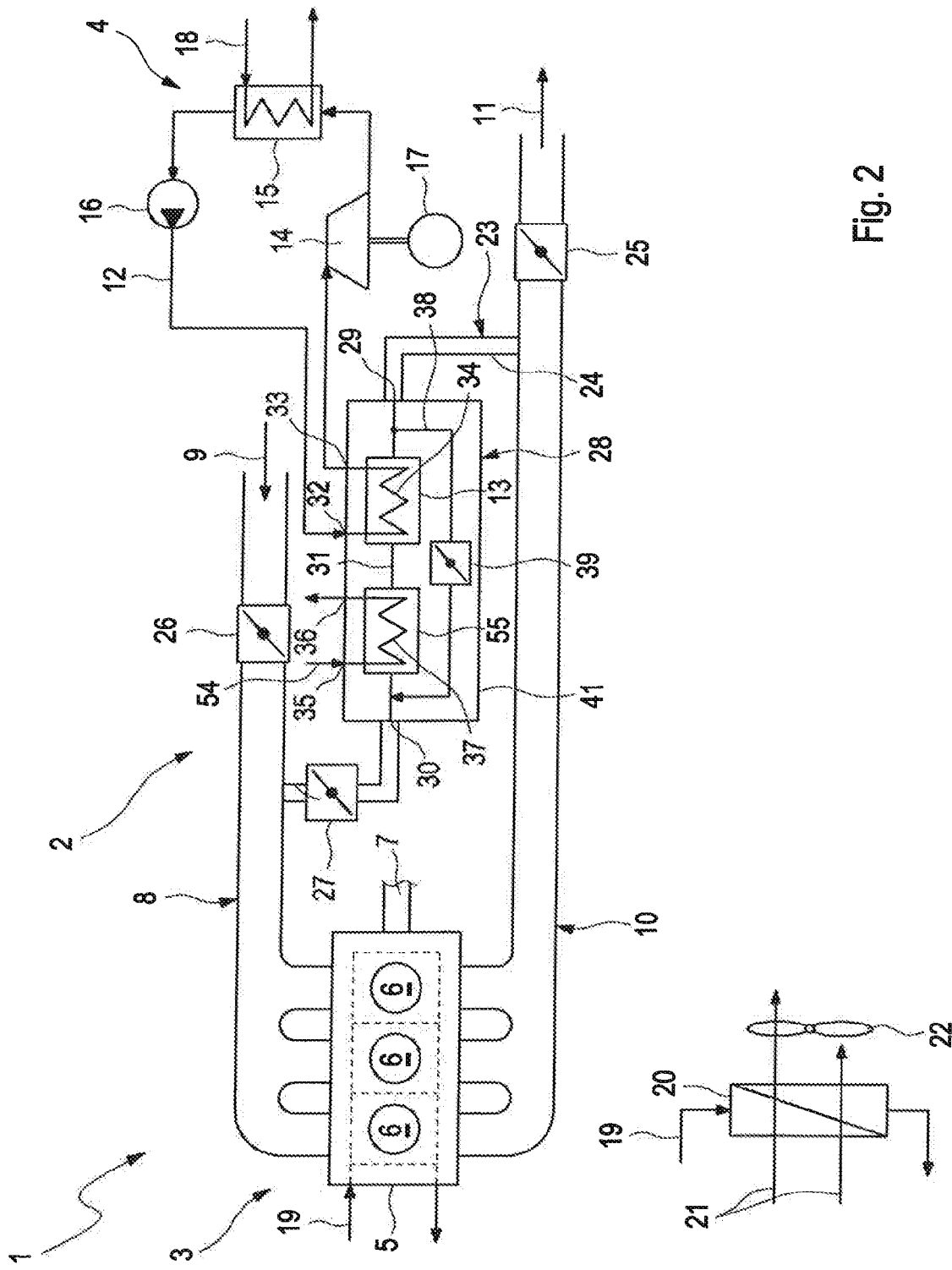
FIG. 2 is a highly simplified block diagram-like schematic view of a vehicle with a device according to the invention in another of various embodiments.

Referring to the drawings in particular, corresponding to FIGS. 1 and 2, a vehicle 1, which may be preferably a land craft, especially a road vehicle, but alternatively a watercraft or an aircraft, comprises a device 2, which in turn comprises an internal combustion engine 3 as well as a waste heat utilization unit 4. Internal combustion engine 3 has an engine block 5, in which a plurality of combustion chambers 6 are arranged, which are defined, for example, by cylinders, in which pistons are arranged, which are adjustable by their strokes. The internal combustion engine 3 is used in the vehicle 1 to drive the vehicle 1 and is connected for this purpose to a drivetrain 7 of the vehicle 1 for driving. For example, a crankshaft of the engine block 5, which crankshaft is not shown here, drives the drivetrain 7.

The internal combustion engine 3 comprises in the usual manner a fresh air feed unit 8 for feeding fresh air to the combustion chambers. A corresponding fresh air flow is indicated by an arrow 9. Furthermore, an exhaust system 10 is provided, which is used to cool the exhaust gas from the combustion chambers 6, a corresponding exhaust gas flow being indicated by an arrow 11.

The waste heat utilization unit 4 comprises a waste heat utilization circuit 12, in which a working medium circulates and in which an evaporator 13 for evaporating the working medium, an expansion engine 14 for expanding the working medium, a condenser 15 for condensing the working medium and a feed means 16 for driving the working medium in the waste heat utilization circuit 12 are arranged one after another in the direction of flow of the working medium. Expansion engine 14 drives, for example, a generator 17 for generating power, which may be coupled, for example, with an electric power storage means, not shown here, for example, with a battery. Condenser 15 is integrated into a cooling circuit 18, in which a cooling medium circulates. The waste heat utilization unit 4 operates according to the Rankine cycle or according to the Rankine-Clausius cycle.

The internal combustion engine 3 is equipped, furthermore, with a cooling circuit 19 for cooling the engine block 5, and a cooling agent path extending in the engine block 5 is indicated by broken line. A cooler 20 is integrated into this cooling circuit 19, and a cooling air flow 21, which is generated in a vehicle 1 during travel, the so-called relative wind, can be admitted to said cooler 20. In addition, the cooling air flow 21 may be generated or intensified by means of a blower 22.

According to FIG. 2, the device 2 may be equipped, besides, with an exhaust gas-recirculating unit 23, which makes it possible to recirculate exhaust gas from the exhaust system 10 to the fresh air feed unit 8. An exhaust gas-recirculating line 24 is connected for this to the exhaust system 10 upstream of a dynamic pressure valve 25 on the exhaust gas side and to the fresh air feed unit 8 downstream of a throttle valve 26 on the fresh air side. The exhaust gas-recirculating unit 23 contains, besides, an exhaust gas-recirculating valve 27, which is arranged in the exhaust gas-recirculating line 24 and can be used to set an exhaust gas recirculation rate.

The respective device 2 is equipped, in addition, with at least one heat exchanger 28, which will be explained in more detail below, especially with reference to FIGS. 3 through 7.

Corresponding to FIGS. 1 through 7, the heat exchanger 28 comprises a first inlet 29 and a first outlet 30 for a primary-side, first medium to be cooled. The first inlet 29 and the first outlet 30 are fluidically connected with one another via a first path 31 carrying the first medium. Heat exchanger 28 has, in addition, a second inlet 32 and a second outlet 33 for a secondary-side, second medium to be heated, which are fluidically connected with one another via a second path 34 carrying the second medium. Furthermore, heat exchanger 28 is equipped with a third inlet 35 and a third outlet 36 for a secondary-side, third medium to be heated, which are fluidically connected with one another via a third path 37 carrying the third medium. The second path 34 and the third path 37 are coupled in the heat exchanger 28 each with the first path 31 in a heat-transferring manner and such that the media are separated from one another. The heat-transferring coupling between the first path 31 and the second path 34 is embodied upstream of the heat-transferring coupling between the first path 31 and the third path 37 relative to the direction of flow of the first medium.

In addition, at least one additional inlet, outlet and path may be provided on the secondary side in another embodiment.

In addition, the heat exchanger 28 has on the primary side a fourth path 38, which is likewise intended for carrying the first medium in the embodiments being shown here, and the fourth path 38 connects the first inlet 29 with the first outlet 30 fluidically while bypassing the heat-transferring couplings of the first path 31 with the second path 34 and with the third path 37. The fourth path 38 thus defines a bypass path for the first path 31 in respect to the heat-transferring couplings with the second path 34 and with the third path 37. Furthermore, a control means 39 is provided, by means of which the flow of the first medium through the first path 31 and the fourth path 38 can be controlled. For example, control means 39 may have a control element 40, which may be embodied, for example, by means of a valve, preferably a butterfly valve, in order to change the cross section through which flow is possible preferably in the first path 31 or in the fourth path 38.

Heat exchanger 28 preferably has a common housing 41, which has the inlets 29, 32, 35 mentioned and the outlets 30, 33, 36 mentioned and which contains the paths 31, 34, 37 and 38 mentioned.

According to the preferred embodiment shown in FIGS. 3 through 7, housing 41 comprises a jacket 42, which has a cylindrical and straight shape. Furthermore, housing 41 contains a tube 43, which is likewise straight and cylindrical and is arranged here coaxially in jacket 42. An internal diameter of jacket 42 is greater than an external diameter of tube 43, so that jacket 42 envelops tube 43 while forming a ring channel 44. Tube 43 is connected to the first inlet 29 via a perforated inlet area 45 and to the first outlet 30 via a perforated outlet area 46. The perforated inlet area 45 results in a fluidic coupling between the first inlet 29 and an inlet area 47 of the ring channel 44. A fluidic coupling is achieved between an outlet area 48 of ring channel 44 and the first outlet 30 via the perforation of outlet area 46.

In all embodiments, tube 32 and jacket 33 may each have a round cross section, which may be circular or oval or elliptical.

The first path 31 is passed through ring channel 44. The fourth path 38 is passed, by contrast, through tube 43. The control means 39 has a control member 40 here as well, which is arranged in tube 43, so that it can vary a cross section of tube 43, through which cross section flow is possible. The control element 40 is brought in FIGS. 4 and 7 into a closed position, in which it essentially closes the cross section of tube 43, through which cross section flow is possible. As a consequence, the first medium flows through ring channel 44, i.e., along the first path 31. By contrast, control element 40 is brought in FIG. 5 into an open position, in which it extensively releases the cross section of tube 32, through which cross section flow is possible. Due to the flow resistance of the ring channel 44, which is likewise open, being very much greater, the first medium flows in this case through tube 43, i.e., along the fourth path 38, and thus bypasses the heat-transferring couplings with the second path 34 and with the third path 37. It is clear that any desired intermediate positions may, in principle, be able to be set as well. The open position of control element 40 is indicated by a broken line in FIGS. 4 and 7 and the closed position of the control element 40 is indicated in FIG. 5.

A first coil 49, which winds helically around tube 43 and through which the second path 34 extends, is arranged in ring channel 44. In other words, the first coil 49 fluidically connects the second inlet 32 and the second outlet 33 with one another. In addition, a second coil 50, which likewise winds helically around tube 43, is arranged in ring channel 44 axially adjacent to the first coil 49. The second coil 50 fluidically connects the third inlet 35 with the third outlet 36, so that the third path 37 passes through the second coil 50. The respective coil 49, 50 has a spiral tube 51 and 52, respectively, which carries the respective medium inside and carries cooling fins 53 on the outside, which are exposed to the first medium in the ring channel 44. An additional coil may be provided for each additional secondary-side path.

Figure 4:
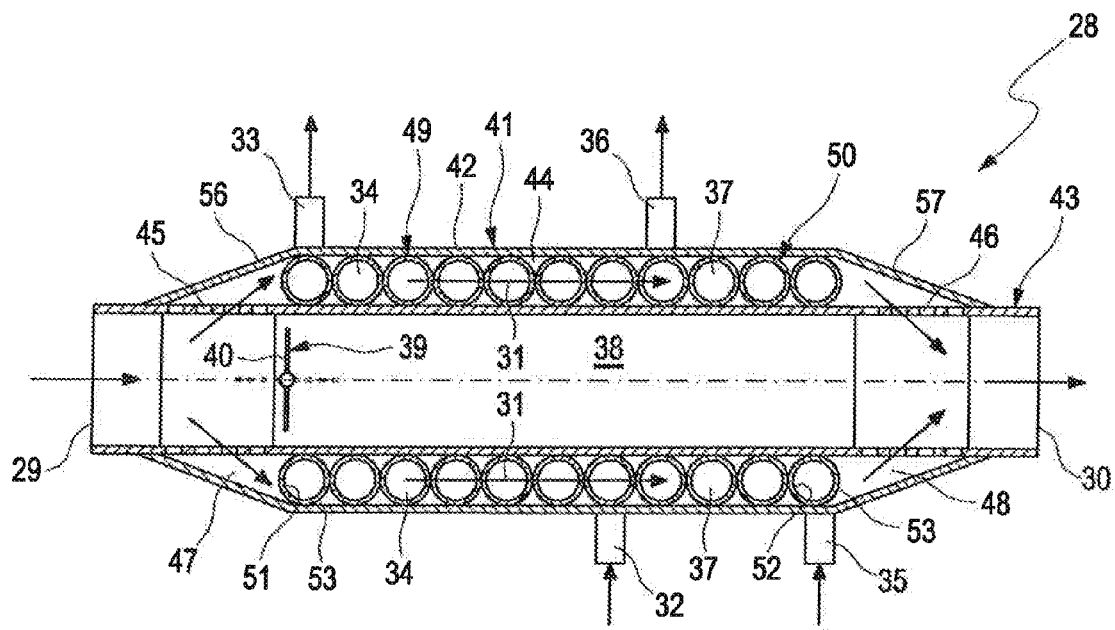
FIG. 4 is a longitudinal sectional view of the heat exchanger in one of different operating states.
Figure 5:
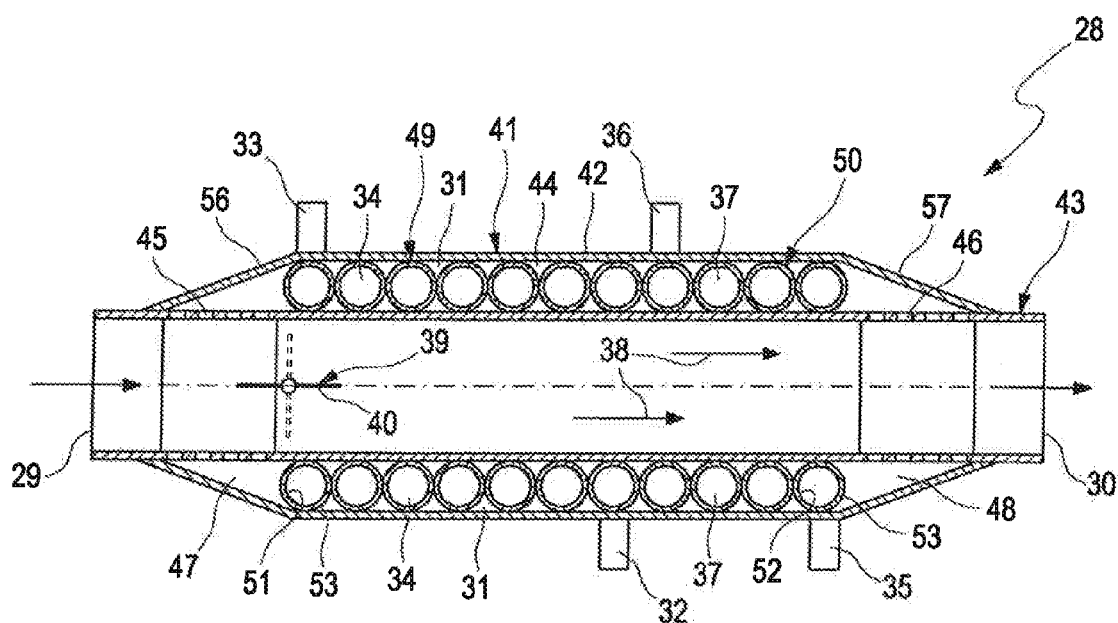
FIG. 5 is a longitudinal sectional view of the heat exchanger in another of different operating states.
Figure 7:
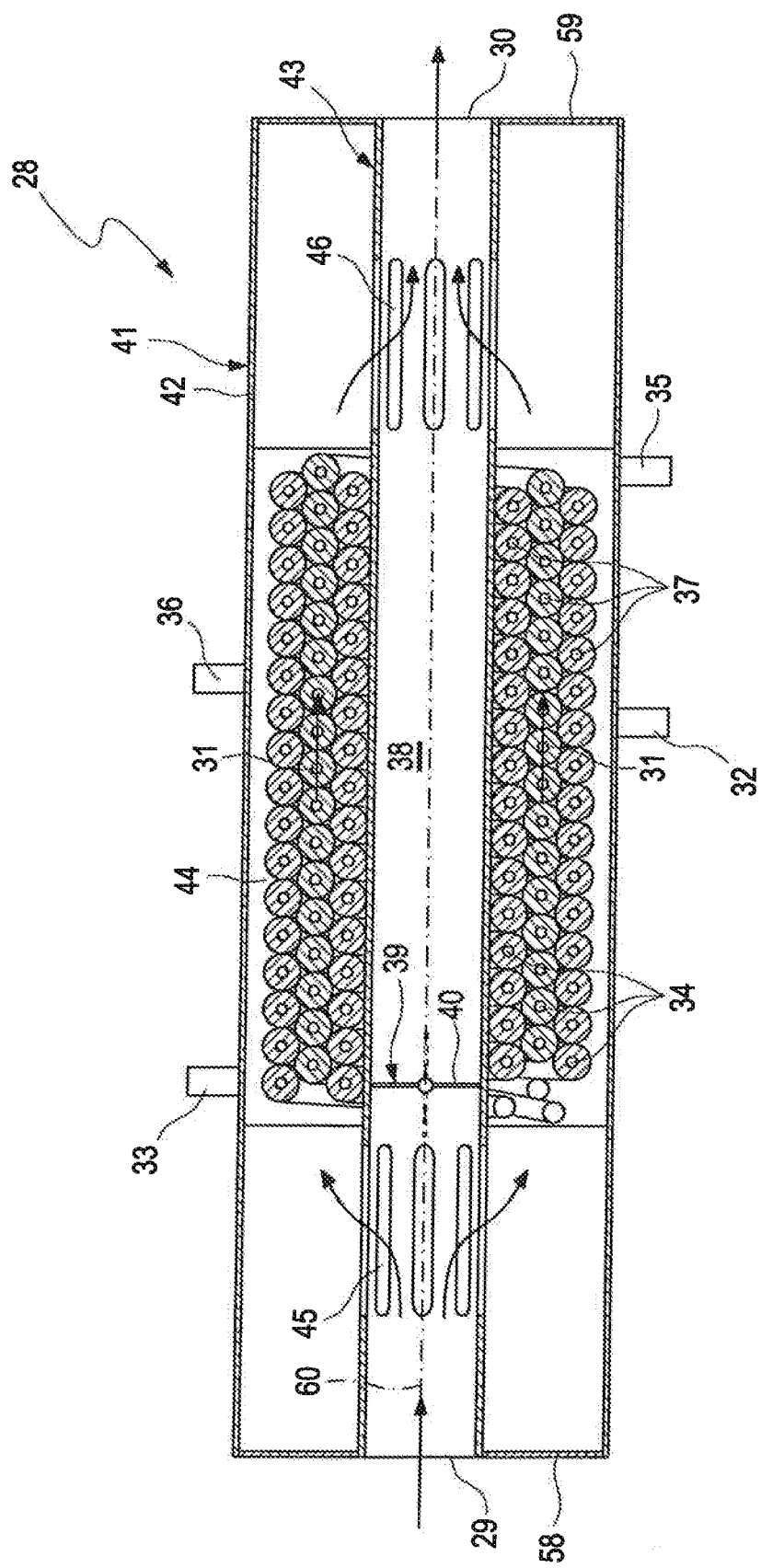
FIG. 7 is a simplified longitudinal sectional view of the heat exchanger in another embodiment.

In the examples according to FIGS. 4 and 5, housing 41 has an inlet funnel 56, which forms the inlet-side transition from tube 43 to jacket 42 and in which the perforated inlet area 45 is located, as well as an outlet funnel 57, which forms the outlet-side transition from tube 43 to jacket 42 and in which the perforated outlet area 46 is located. Contrary to this, FIG. 7 shows an embodiment that has an inlet-side end bottom 58 or inlet end bottom 58 instead of the inlet funnel 56 and an outlet-side end bottom 59 or outlet end bottom 59 instead of the outlet funnel 57, where said end bottoms 58 and 59 define the front-side ends of housing 41 and which are fastened to jacket 42, for example, by means of beading. Jacket 42 and tube 43 are not connected directly to one another in this case. Jacket 42 covers in this case both the gas-permeable inlet area 45 and the gas-permeable outlet area 46 in the axial direction 60 of the heat exchanger 28 in this case.

Figure 6:
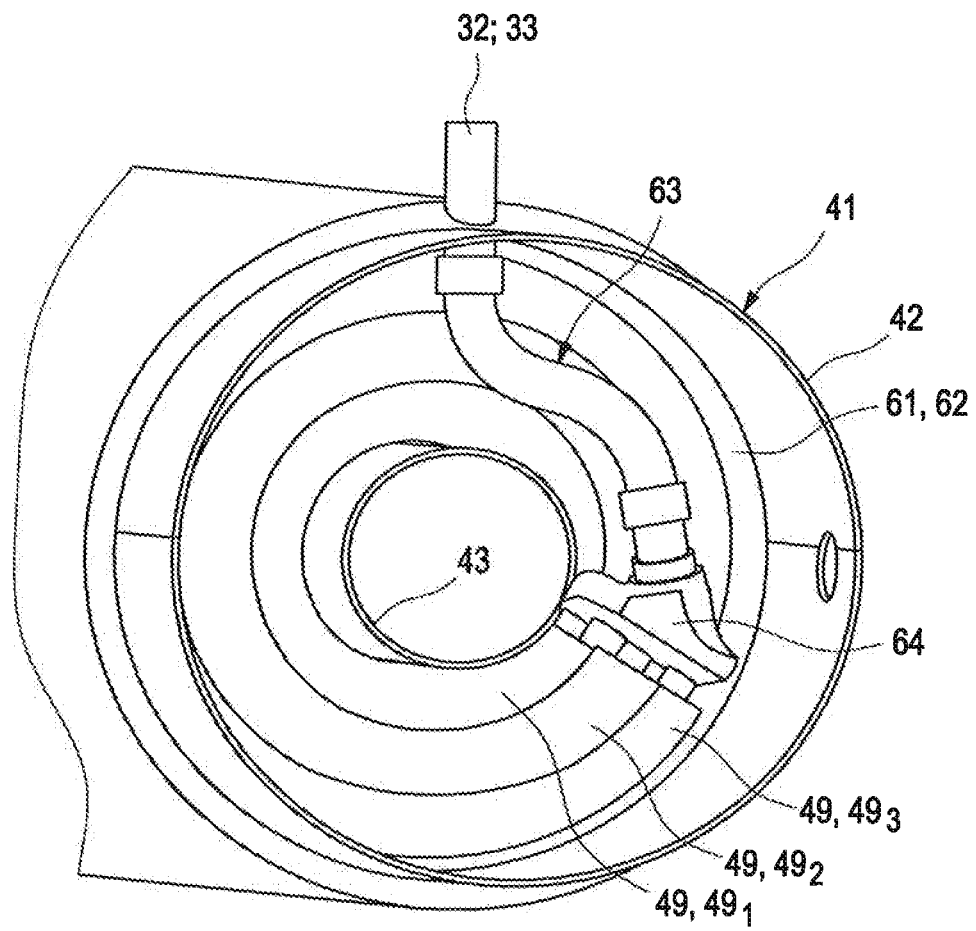
FIG. 6 is an isomeric sectional view of the heat exchanger in the area of an uncoupling element.

Provisions may be made according to FIG. 6 for the coils 49, 50 to be in contact with tube 43 radially on the inside via a thermal insulator. In addition or as an alternative, at least the first coil 49 may be in contact with jacket 42 radially on the outside via a thermal insulator 61. In addition or as an alternative to such an outer insulation 61, a mount 62 may be provided, which is supported at jacket 42, on the one hand, and at the respective coil 49 and/or 50, on the other hand, in order to fix the coil 49, 50 axially in jacket 42. Mount 62 may be especially advantageously a thermally insulating mount 62, e.g., in the form of a mounting mat. Such an outer mount 62 acting as an insulation can be recognized in FIG. 6. According to a preferred embodiment, only the first coil 49 is insulated thermally towards the outside, while such a thermal insulation may be omitted in the second coil 50.

While exactly two coils 49, 50, which are arranged axially next to each other as radially one-layer coils, are provided according to the embodiment shown in FIGS. 3 through 5, FIGS. 6 and 7 show an embodiment in which at least one of these coils 49, 50, preferably the first coil 49, has a radially three-layer design and comprises three partial coils $49_1$, $49_2$ and $49_3$, which are arranged radially adjacent to one another and are arranged coaxially one in the other. As a result, the cross section of the first path 34, through which cross section flow is possible, can be increased correspondingly, which reduces the flow resistance and the pressure loss in the first path 34 in case of a short overall length. A corresponding features is also present concerning the second path 37 according to FIG. 7.

Corresponding to FIG. 6, a fluidic connection of the respective coil 49, 50, here the first coil 49, with the corresponding, housing-side secondary port, i.e., with the second inlet 32 or with the second outlet 33, is not brought about directly according to a preferred embodiment, but via an uncoupling element 63, i.e., indirectly. The respective uncoupling element 63 is arranged in the interior of housing 41. It is movable and flexible and can compensate relative motions between the respective coil 49 and the housing 41 or the jacket 42. Such relative motions may develop, for example, because of different coefficients of thermal expansion of the jacket 42 and of the respective coil 49. The uncoupling element 63 may be configured, for example, as a metal corrugated hose or spiral wound metal hose. It may have a radially one-layer or multilayer design. It may have an elastic protective layer on the inside and/or on the outside, which covers the corrugated structure of the corrugated hose. Such a protective layer may be designed, for example, as a spiral wound metal hose. In the example shown in FIG. 6, uncoupling element 63 is fluidically connected with the respective secondary port 32 and 33 at one end and with a distributor element 64 or with a collector element 64 at the other end, which is, in turn, connected fluidically, purely as an example in FIG. 7, with the aforementioned three partial coils $49_1$, $49_2$, $49_3$. If, as in the examples shown in FIGS. 3 through 5, only one coil 49 is provided, the uncoupling element 63 is connected directly with coil 49.

Heat exchanger 28 is integrated in device 2 in the embodiment shown in FIG. 1 such that its first path 31 is integrated into the exhaust system 10. The first inlet 29 and the first outlet 30 are connected for this to the exhaust system 10. Consequently, the first medium is formed by the exhaust gas. The second path 34 is integrated into the waste heat utilization circuit 12. The second inlet 32 and the second outlet 33 are connected for this to the waste heat utilization circuit 12. Consequently, the working medium forms the second medium. Furthermore, the evaporator 13 is formed by the heat-transferring coupling between the first path 31 and the second path 34, i.e., it is embodied within the heat exchanger 28. The third path 37 is in this case integrated into a cooling circuit 54, so that a cooling medium, which circulates in the cooling circuit 54, forms the third medium. Cooling circuit 54 may in this case be integrated into the cooling circuit 19 for cooling the engine block 5 and/or into the cooling circuit 18 for cooling condenser 15.

The heat exchanger 28 is integrated into the exhaust gas-recirculating unit 23 in the embodiment shown in FIG. 2 such that the first path 31 is integrated into the exhaust gas-recirculating unit 23 or the exhaust gas-recirculating line 24 thereof. The first inlet 29 and the first outlet 30 are connected for this to the exhaust gas-recirculating unit 23, such that the recirculated exhaust gas forms the first medium. The second path 34 is integrated into the waste heat utilization circuit 12 here as well, so that the working medium of the waste heat utilization unit 4 forms the second medium of the heat exchanger 28. The third path 37 is again integrated into the cooling circuit 54, so that the cooling medium thereof forms the third medium of the heat exchanger 28. Provisions may be made here as well for the cooling circuit 54 to be integrated into the cooling circuit 19 for cooling the engine block 5 and/or into the cooling circuit 18 for cooling the condenser 15. As an alternative, cooling circuit 54 may also be coupled with a heat exchanger, by means of which an air flow, which can fed to a passenger compartment of a vehicle 1 for air conditioning same, can be heated.

The evaporator 13 of the waste heat utilization unit 4 is again embodied in the embodiment shown in FIG. 2 by the heat-transferring coupling of the first path 31 with the second path 34, i.e., in heat exchanger 28. The heat-transferring coupling between the first path 31 and the third path 37 defines, by contrast, an exhaust gas recirculation cooler 55, by means of which the recirculated exhaust gas can be cooled to a predetermined target temperature. The corresponding cooling circuit 54 is preferably integrated into the engine cooling circuit 19 or into a separate cooling circuit, to which a cooling air flow can likewise be admitted via a separate cooler.

Figure 3:
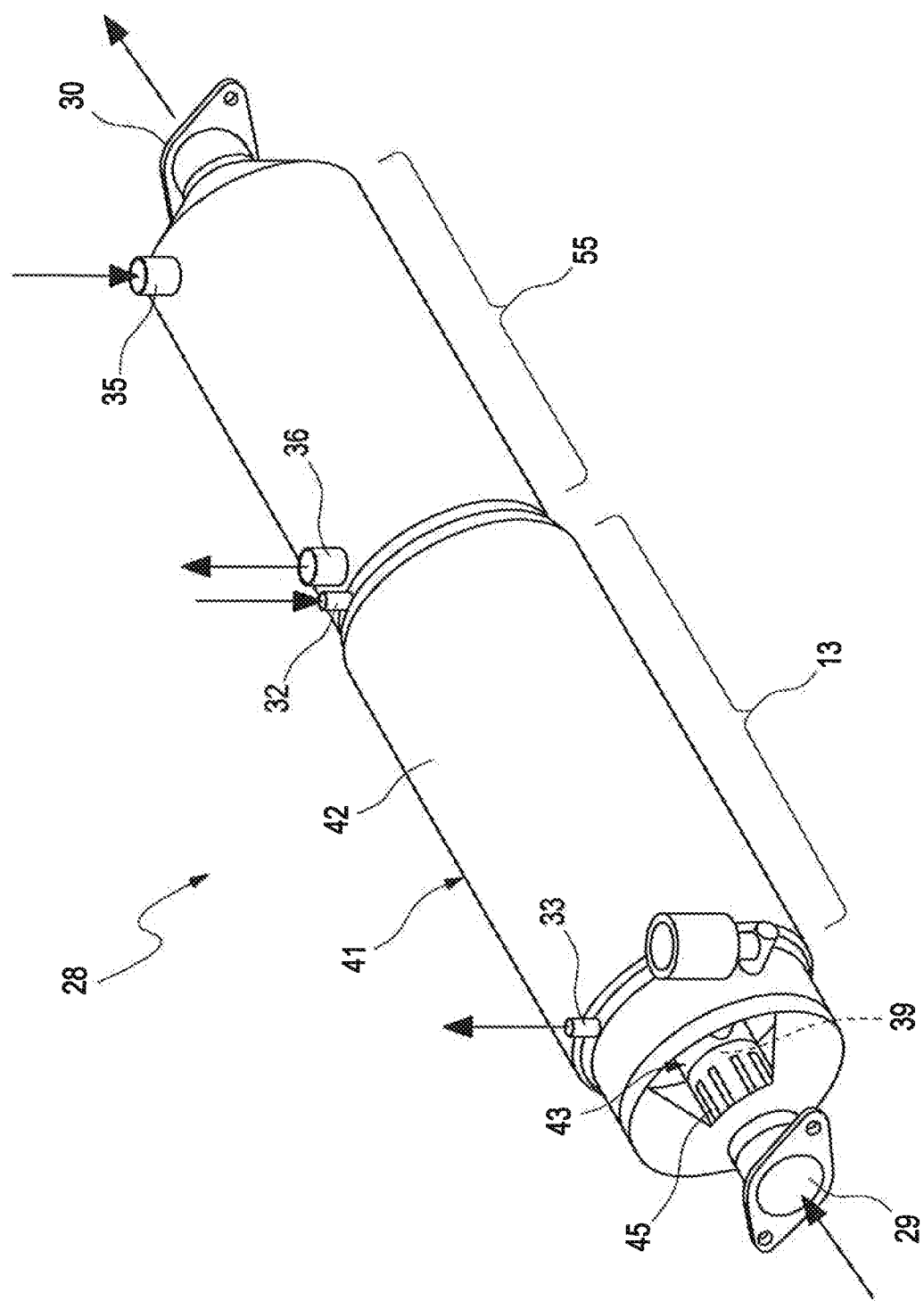
FIG. 3 is an isometric view of a heat exchanger.

The areas of the heat exchanger 28 that form the evaporator 13 of the waste heat utilization unit 4 or the cooler 55 of the exhaust gas-recirculating unit 23 are indicated by braces in FIG. 3 for the use of the heat exchanger 28 in the exhaust gas-recirculating unit 23, which use is shown in FIG. 2.

The direction of flow of the second medium in the second path 34 and the direction of flow of the third medium in the third path 37 are in counterflow in relation to the direction of flow of the first medium in the first path 31 in the embodiments being shown here. By contrast, provisions may be made in an alternative embodiment for the direction of flow of the third medium in the third path 37 to be in co-current flow relative to the direction of flow of the first medium in the first path 31 in an alternative embodiment in order to reduce a third tendency towards evaporation of the third medium, e.g., in the exhaust gas-recirculating cooler 55. The second medium may remain in counterflow in this case.

While specific embodiments of the invention have been shown and described in detail to illustrate the application of the principles of the invention, it will be understood that the invention may be embodied otherwise without departing from such principles.

What is claimed is:

1. A heat exchanger comprising:
   a first inlet and a first outlet for a first medium to be cooled, the first inlet and first outlet being fluidically connected with one another via a first path carrying the first medium;
   a second inlet and a second outlet for a second medium to be heated, the second inlet and the second outlet being fluidically connected with one another via a second path carrying the second medium; and
   a third inlet and a third outlet for a third medium to be heated, the third inlet and the third outlet being fluidically connected with one another via a third path carrying the third medium, wherein:
   the first path is coupled with the second path and with the third path in a heat-transferring manner and such that the media are separated from one another;
   the heat-transferring coupling between the first path and the second path takes place upstream of the heat-transferring coupling between the first path and the third path in relation to a direction of flow of the first medium;
   a fourth path for carrying the first medium, the fourth path bypassing the heat-transferring couplings of the first path with the second path and the first path with the third path, the fourth path fluidically connecting the first inlet with the first outlet; and
   a control for controlling the flow of the first medium in the first path and the fourth path;
   a common housing has the first inlet and first outlet, the second inlet and the second outlet and the third inlet and the third outlet and contains the first path, the second path, the third path and the fourth path.

2. A heat exchanger in accordance with claim 1, wherein:
   the housing comprises a jacket and contains a tube, the jacket enveloping the tube and forming a ring channel;
   the first path is defined by the ring channel;
   the second path is defined by a first coil, which extends in the ring channel and winds helically around the tube;
   the third path is defined by a second coil, which extends in the ring channel and winds helically around tube;
   the fourth path passes through tube, and
   the control comprises a control element arranged in the tube for changing a cross section of tube, through which cross section flow is possible.

3. A heat exchanger in accordance with claim 2, wherein at least one of the coils has a spiral tube, which carries on the inside the respective medium and carries cooling fins, exposed to the first medium, on the outside.

4. A heat exchanger in accordance with claim 2, wherein:
   one of said coils comprises a plurality of partial coils which are arranged radially adjacent to one another and are arranged coaxially one in the other with respect to said tube;
   an uncoupling element fluidically connects said partial coils and a corresponding said inlet or a corresponding outlet of said one coil, said uncoupling element is movable and flexible and to compensate for relative motions between said one coil and said housing.

5. A device comprising:
   an internal combustion engine comprising internal combustion chambers and a fresh air feed unit for feeding fresh air to the combustion chambers and an exhaust system for removing exhaust gas from the combustion chambers;
   a waste heat utilization unit comprising a waste heat utilization circuit, in which a working medium circulates, an evaporator for evaporating the working medium, downstream therefrom an expansion engine, for expanding the working medium, downstream therefrom a condenser, for condensing the working medium and downstream therefrom a feed unit, for driving the working medium in the waste heat utilization circuit;
   a cooling circuit in which a cooling medium circulates; and
   a heat exchanger comprising a first inlet and a first outlet for a first medium to be cooled, the first inlet and first outlet being fluidically connected with one another via a first path carrying the first medium, a second inlet and a second outlet for a second medium to be heated, the second inlet and the second outlet being fluidically connected with one another via a second path carrying the second medium, a third inlet and a third outlet for a third medium to be heated, the third inlet and the third outlet being fluidically connected with one another via a third path carrying the third medium, wherein the first path is coupled with the second path and with the third path in a heat-transferring manner and such that the media are separated from one another; and the heat-transferring coupling between the first path and the second path takes place upstream of the heat-transferring coupling between the first path and the third path in relation to a direction of flow of the first medium, wherein:
the first path is integrated into the exhaust system, so that the exhaust gas forms the first medium;
the second path is integrated into the waste heat utilization circuit, so that the working medium forms the second medium and that the heat-transferring coupling between the first path and the second path forms the evaporator; and
the third path is integrated into the cooling circuit, whereby the cooling medium forms the third medium.

6. A device in accordance with claim 5, wherein the cooling circuit at least one of cools the internal combustion engine and heats an air flow for air conditioning a passenger compartment of a vehicle.

7. A device according to claim 5, wherein the device is a part of a vehicle that is one of a land craft, an aircraft and a watercraft, the vehicle further comprising a drivetrain for driving the vehicle, wherein the internal combustion engine is connected to the drivetrain for driving.

8. A device in accordance with claim 5, wherein the heat exchanger further comprises:
a fourth path for carrying the first medium, the fourth path bypassing the heat-transferring couplings of the first path with the second path and the first path with the third path, the fourth path fluidically connecting the first inlet with the first outlet; and
a control for controlling the flow of the first medium in the first path and the fourth path.

9. A device in accordance with claim 8, wherein a common housing has the first inlet and first outlet, the second inlet and the second outlet and the third inlet and the third outlet and contains the first path, the second path, the third path, and the fourth path.

10. A device in accordance with claim 9, wherein:
the housing comprises a jacket and contains a tube, the jacket enveloping the tube and forming a ring channel;
the first path is defined by the ring channel;
the second path is defined by a first coil, which extends in the ring channel and winds helically around the tube;
the third path is defined by a second coil, which extends in the ring channel and winds helically around tube;
the fourth path passes through tube, and
the control comprises a control element arranged in the tube for changing a cross section of tube, through which cross section flow is possible.

11. A device in accordance with claim 10, wherein at least one of the coils has a spiral tube, which carries on the inside the respective medium and carries cooling fins, exposed to the first medium, on the outside.

12. A device in accordance with claim 10, wherein:
one of said coils comprises a plurality of partial coils which are arranged radially adjacent to one another and are arranged coaxially one in the other with respect to said tube;
an uncoupling element fluidically connects said partial coils and a corresponding inlet or a corresponding outlet of said one coil, said uncoupling element being movable and flexible to compensate for relative motions between said one coil and said housing.

13. A device comprising:
an internal combustion engine comprising combustion chambers and a fresh air feed unit for feeding fresh air to the combustion chambers, an exhaust system for removing exhaust gas from the combustion chambers and an exhaust gas-recirculating unit for recirculating exhaust gas from the exhaust system to the fresh air feed unit;
a waste heat utilization unit comprising a waste heat utilization circuit, in which a working medium circulates, an evaporator for evaporating the working medium, downstream therefrom an expansion engine for expanding the working medium, downstream therefrom a condenser for condensing the working medium and downstream therefrom a feed means for driving the working medium in the waste heat utilization circuit;
a cooling circuit, in which a cooling medium circulates and which has a cooler for cooling the recirculated exhaust gas; and
a heat exchanger comprising a first inlet and a first outlet for a first medium to be cooled, the first inlet and first outlet being fluidically connected with one another via a first path carrying the first medium, a second inlet and a second outlet for a second medium to be heated, the second inlet and the second outlet being fluidically connected with one another via a second path carrying the second medium, a third inlet and a third outlet for a third medium to be heated, the third inlet and the third outlet being fluidically connected with one another via a third path carrying the third medium, wherein the first path is coupled with the second path and with the third path in a heat-transferring manner and such that the media are separated from one another; and the heat-transferring coupling between the first path and the second path takes place upstream of the heat-transferring coupling between the first path and the third path in relation to a direction of flow of the first medium, wherein:
the first path is integrated into the exhaust gas-recirculating unit, so that the recirculated exhaust gas forms the first medium;
the second path is integrated into the waste heat utilization circuit, so that the working medium forms the second medium, and the heat-transferring coupling between the first path and the second path forms the evaporator; and
the third path is integrated into the cooling circuit whereby the cooling medium forms the third medium and that the heat-transferring coupling between the first path and the third path forms the cooler.

14. A device in accordance with claim 13, wherein the cooling circuit at least one of cools the internal combustion engine and heats an air flow for air conditioning a passenger compartment of a vehicle.

15. A device according to claim 13, wherein the device is a part of a vehicle that is one of a land craft, an aircraft and a watercraft, the vehicle further comprising a drivetrain for driving the vehicle, wherein the internal combustion engine is connected to the drivetrain for driving.

16. A device in accordance with claim 13, further comprising:
a fourth path for carrying the first medium, the fourth path bypassing the heat-transferring couplings of the first path with the second path and the first path with the third path, the fourth path fluidically connecting the first inlet with the first outlet; and
a control for controlling the flow of the first medium in the first path and the fourth path.

17. A device in accordance with claim 16, wherein a common housing has the first inlet and first outlet, the second inlet and the second outlet and the third inlet and the third outlet and contains the first path, the second path, the third path, and the fourth path.

18. A device in accordance with claim 17, wherein:
the housing comprises a jacket and contains a tube, the jacket enveloping the tube and forming a ring channel;
the first path is defined by the ring channel;
the second path is defined by a first coil, which extends in the ring channel and winds helically around the tube;
the third path is defined by a second coil, which extends in the ring channel and winds helically around tube;
the fourth path passes through tube, and
the control comprises a control element arranged in the tube for changing a cross section of tube, through which cross section flow is possible.

19. A device in accordance with claim 18, wherein at least one of the coils has a spiral tube, which carries on the inside the respective medium and carries cooling fins, exposed to the first medium, on the outside.

20. A device in accordance with claim 18, wherein:
one of said coils comprises a plurality of partial coils which are arranged radially adjacent to one another and are arranged coaxially one in the other with respect to said tube;
an uncoupling element fluidically connects said partial coils and a corresponding inlet or a corresponding outlet of said one coil said uncoupling element being movable and flexible to compensate for relative motions between said one coil and said housing.

* * * * *